United States Patent [19]
Dunbar

[11] Patent Number: 5,820,314
[45] Date of Patent: *Oct. 13, 1998

[54] TOOL FOR CENTERING A PUNCH OR DRILL ON A STUD'S BROKEN FACE

[76] Inventor: David A. Dunbar, P.O. Box 390380, Anza, Calif. 92539

[ * ] Notice: The term of this patent shall not extend beyond the expiration date of Pat. No. 5,388,933.

[21] Appl. No.: 675,468

[22] Filed: Jul. 3, 1996

Related U.S. Application Data

[63] Continuation-in-part of Ser. No. 600,513, Feb. 13, 1996, abandoned.

[51] Int. Cl.⁶ .............................. B23B 41/00; B23B 49/00
[52] U.S. Cl. .......................... 408/72 B; 408/80; 408/84; 408/115 B
[58] Field of Search ..................................... 408/72 B, 79, 408/80, 81, 115 R, 115 B, 241 B, 84; 81/53.2; 29/426.4

[56] References Cited

U.S. PATENT DOCUMENTS

| | | |
|---|---|---|
| 1,458,076 | 6/1923 | Potts . |
| 2,165,485 | 7/1939 | Jackman ..................................... 77/62 |
| 2,391,405 | 12/1945 | Fuglie ....................................... 29/148 |
| 2,779,218 | 1/1957 | Edgerton .................................... 77/55 |
| 3,439,567 | 4/1969 | Denis ......................................... 81/53 |
| 3,508,321 | 4/1970 | Wood ....................................... 29/427 |
| 3,999,452 | 12/1976 | Larsen ..................................... 82/4 C |
| 4,238,979 | 12/1980 | Jines ........................................ 82/38 R |
| 4,759,666 | 7/1988 | Grab ..................................... 408/115 B |
| 4,831,902 | 5/1989 | McClure ................................ 81/53.2 |
| 4,940,370 | 7/1990 | Gipson .................................. 408/72 R |
| 5,154,548 | 10/1992 | Walsh .................................... 408/72 R |
| 5,388,933 | 2/1995 | Dunbar .................................. 408/72 B |
| 5,649,791 | 7/1997 | Connolly ............................. 408/115 B |

*Primary Examiner*—Daniel W. Howell
*Attorney, Agent, or Firm*—Brown, Martin, Haller & McClain, LLP

[57] ABSTRACT

A tool for preparing broken stud bolts or the like for extraction by screw extractors has a guide for centering a center punch and/or a drill on a broken face of a stud. The guide is a nut and a shaft assembly. The nut has a central bore therethrough having a first portion threaded to mate with the stud threads and a second portion bored to just slide over the stud threads. The shaft assembly has a cylindrical shaft having a first end and a second end and an axial bore therethrough. The shaft includes a first externally threaded portion extending from the shaft first end of threads similar to those of the broken stud and an expandable sleeve attached to the shaft second end such that threading movement of the nut toward the shaft second end axially compresses the sleeve whereby the sleeve expands radially outward. The second end of the shaft has a conical end face. The shaft assembly and nut can be used in a variety of configurations that center the axial bore of the shaft over the stud's broken end face so that a drill or center punch can be inserted in the shaft's axial bore.

12 Claims, 2 Drawing Sheets

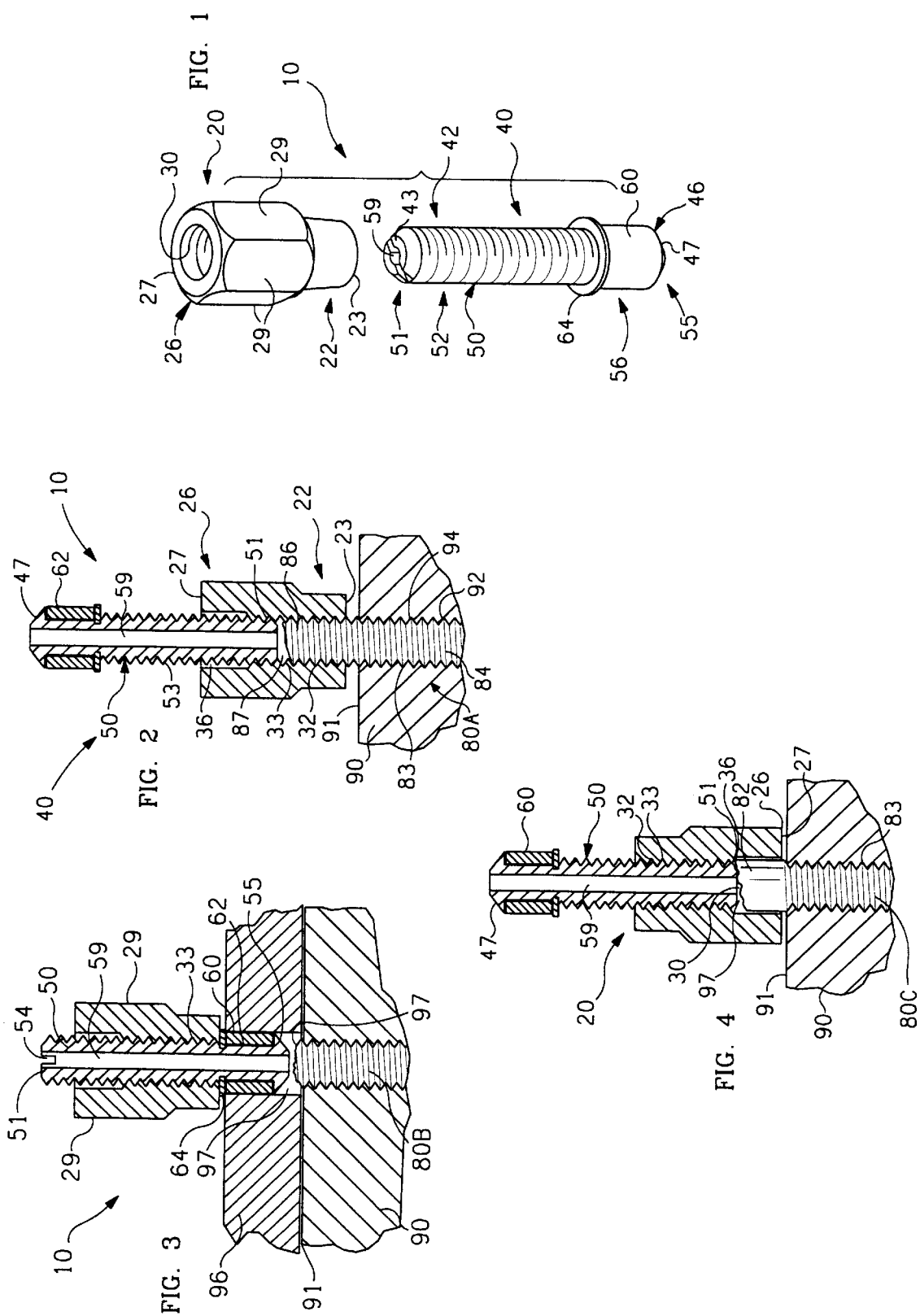

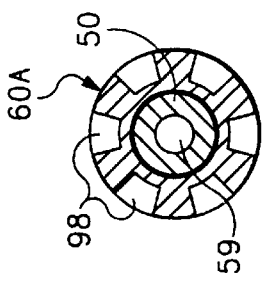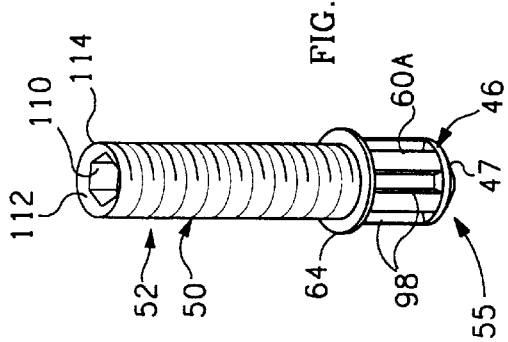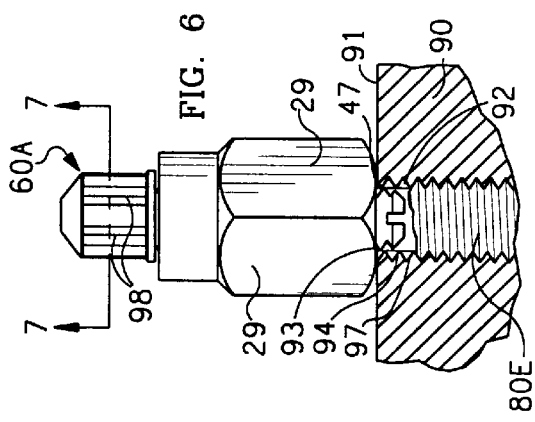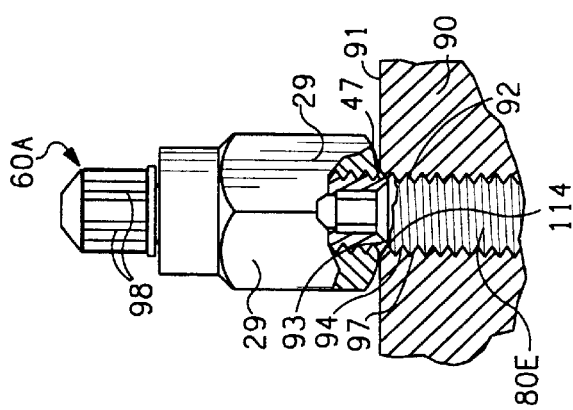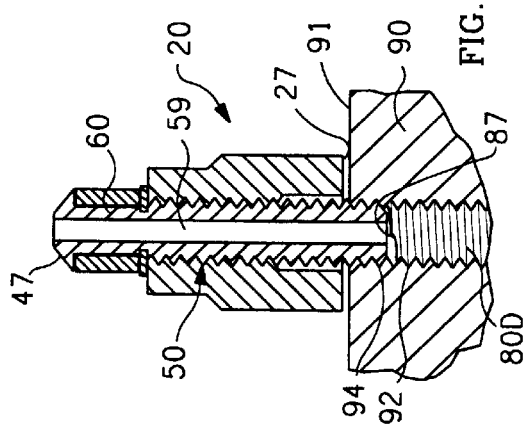

5,820,314

TOOL FOR CENTERING A PUNCH OR DRILL ON A STUD'S BROKEN FACE

CROSS-REFERENCES TO RELATED APPLICATIONS

This application is a Continuation-In-Part of application Ser. No. 08/600,513 of the same Applicant, filed Feb. 13, 1996, now abandoned, and is also related to U.S. Pat. No. 5,388,933 of Dunbar.

BACKGROUND OF THE INVENTION

1. Field of the Invention

This invention is a tool for preparing broken stud bolts or the like for extraction by screw extractors and more specifically is a guide for centering a center punch and/or a drill on the broken face of a stud.

2. Background of the Invention

When a stud bolt breaks off, it leaves, in the threaded bore, a threaded portion which must be removed prior to insertion of a new stud. Typically, the remaining portion is removed by drilling into the stud's broken face, by driving or screwing an extractor into the drilled hole to engage the stud remnant and, then, by turning the extractor to unscrew the remnant from the hole.

It is highly desirable that the hole be drilled axially for several reasons. First, drilling an off-center hole may damage the bore threads. Second, an axial hole may prevent extractor breakage. An axial hole allows use of the largest possible drill, without damaging the threads, which, in turn, allows use of the largest possible extractor. Also, an extractor is less likely to be broken because less force needs to be applied to an extractor in an axial hole to provide the necessary extraction torque.

However, the typical rough and slanted broken face of a stud makes drilling an axial hole difficult.

Additionally, stud bolts break off in a variety of positions: far into the bore, in the bore near the orifice, at a threaded portion outside the bore, at a shank portion outside the bore or in the larger bore of an attached captive piece.

Therefore, it is desirable to have a tool for guiding of a center punch and/or drill into engagement with a stud's broken face regardless of the location of the break.

SUMMARY OF THE INVENTION

This invention is a tool for preparing broken stud bolts or the like for extraction by screw extractors and more specifically is a guide for centering a center punch and/or drill on the broken face of a stud. In an exemplary embodiment, the tool comprises a nut and a shaft assembly. The nut has a central bore therethrough having a first portion threaded to mate with the stud threads and a second portion bored to just slide over the stud threads. The shaft assembly has a cylindrical shaft having a first end and a second end and an axial bore therethrough. The shaft includes a first externally threaded portion extending from the shaft first end of threads similar to those of the broken stud and an expandable sleeve attached to the shaft second end such that threading movement of the nut toward the shaft second end axially compresses the sleeve whereby the sleeve expands radially outward. The second end of the shaft has a conical end face.

The shaft assembly and nut can be used in a variety of configurations that center the axial bore of the shaft over the stud's broken end face so that a drill or center punch can be inserted in the shaft's axial bore.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 1 is an elevated exploded perspective view of a prior art tool as described in my U.S. Pat. 5,388,933;

FIG. 2 is a longitudinal cross-sectional view of the prior art tool attached to a broken stud having exposed threads;

FIG. 3 is a longitudinal cross-sectional view of the prior art centered in the bore of a captive part;

FIG. 4 is a longitudinal cross-sectional view of the prior art centered around a stud maximum diameter;

FIG. 5 is a longitudinal cross-sectional view of the prior art threaded in a bore;

FIG. 6 is a side view of a tool according to a first embodiment of the invention centered in the entrance of a bore containing a broken stud (shown in cross-section);

FIG. 7 is an expanded section on the lines 7—7 of FIG. 6;

FIG. 8 is a perspective view of a modified shaft according to a second embodiment of the invention for use with the nut of FIGS. 1 to 5 or the nut of FIGS. 6 and 7; and FIG. 9 is a side view of the tool with the shaft of FIG. 8, partially in section, centered over the entrance of a bore containing a broken stud.

DETAILED DESCRIPTION OF THE PREFERRED EMBODIMENTS

With reference now to the drawings, FIG. 1 is an elevated exploded perspective view of a prior art tool as described in my U.S. Pat. No. 5,388,933, denoted generally as 10. In general, tool 10 comprises a nut, denoted generally as 20, and a shaft assembly, denoted generally as 40.

Nut 20 has a first end 22, having an end face 23, a second end 26, having an end face 27, and a central bore 30 therebetween.

Shaft assembly 40 has a first end 42, having an end face 43, and a second end 46, having an end face 47. In general, shaft assembly 40 includes a cylindrical shaft 50 having a first end 51 defining the shaft assembly first end 42, a second end 55 and an axial bore 59 therebetween. Shaft 50 includes a first portion 52 extending from shaft first end 51 toward shaft second end 55. Shaft first portion 52 includes external threads 53, preferably matching those of a stud to be removed. Shaft 50 includes a second portion 56 extending from shaft second end 55 toward shaft first end 51. An expandable sleeve 60 is attached to shaft second portion 56 between metal washer 64 and an enlarged diameter portion at the end of shaft second portion 56, as best illustrated in FIG. 2. Although the second end portion 56 is shown as one piece in the drawings, it will be understood that a separate, enlarged end cap may be used which is secured to the end of the shaft so as to hold sleeve 62 in position after sliding sleeve 62 over the shaft up to washer 64.

FIGS. 2–5 show the use of tool 10 with various possible configurations of a broken stud 80A–E.

Turning now to FIG. 3, there is shown a longitudinal cross-sectional view of tool 10 attached to the broken end 80A of a stud. A block of metal, such as engine block 90, has a surface 91 and includes a bore 92 having internal threads 94 in which the broken end (broken stud 80A) of a stud is lodged. Broken stud 80A has external threads 83, an inner end 84 and an outer end 86 having a broken end face 87. Broken stud 80A has an outer end 86 that protrudes above surface 91 of block 90 and that is threaded to broken end face 87. If a stud is broken in this configuration, the best manner to use tool 10 is now described.

The central bore 30 of nut 20 includes a first portion 32 extending from nut first end 22 toward nut second end 26 including internal threads 33 and a second portion 36 extending from nut second end 26 to internal threads 33. Nut second portion 36 is bored to just freely slide over external threads that would threadably engage nut internal threads 33, e.g. shaft threads 53 and stud threads 83. With nut first end 22 facing broken stud 80A, some nut internal threads 33 are threaded on outer end 86 of stud 80A. First end 51 of shaft 50 is inserted from nut second end 26 into bore second portion 36 and threads 53 threaded onto some of the remaining threads 33 of first portion 32. Axial bore 59 is now centered on broken end face 87. An axial hole can be drilled in broken end face 87 by inserting a drill through axial bore 59. Also, a center punch can be inserted into bore 59 for center punching end face 87.

FIG. 3 is a longitudinal cross-sectional view of tool 10 centered in the bore 97 of a captive part, such as exhaust manifold 96. This is a common situation in which broken stud 80B is one of the studs that holds attached piece 96 captive. It is desirable to remove broken stud 80B without removing piece 96 because removing piece 96 requires removal of all of the other studs. In this situation, expandable sleeve 60 is inserted in bore 97 of manifold 96. Nut internal threads 33 are threadably engaged with shaft threads 53 and nut 20 is screwed toward shaft second end 55 and axially compresses sleeve 60 whereby sleeve 60 expands radially outward and becomes lodged in bore 97. Sleeve 60 may be made of any suitable material. A sleeve 60 made of polyurethane has proven satisfactory. Sleeve 60 includes an inner bore 62 that is freely journaled over shaft 50. A metal washer 64 between sleeve 60 and nut 20 is a bearing surface so that nut 20 does not turn sleeve 60. Nut 20 includes gripping means, such as external flats, such a hexagonal flats 29, for gripping nut 20 such that a torque can be applied to nut 20. Shaft assembly 40 includes engaging means, such as slot 54 for receiving a screwdriver head or other engaging means of a tool for applying torque to shaft 50.

FIG. 4 is a longitudinal cross-sectional view of tool 10 centered around the shaft portion 82 of broken stud 80C. Broken stud 80C is broken through a shaft portion 82 which has a diameter of substantially that of the maximum diameter of stud threads. Second portion 36 of nut bore 30 is slid over stud shaft 82. This centers bore 30 on end face 97. Shaft 50 is screwed into nut bore first portion 32 until first end 51 is near broken end face 97.

FIG. 5 is a longitudinal cross-sectional view of the tool 10 centered on broken stud 80D which is broken off in bore 92 of block 90. In this configuration, nut 20 is typically removed from shaft assembly 40 and shaft first end 51 is simply screwed into bore 92 with shaft threads 53 engaging bore threads 94. Alternatively, if only a few threads can be engaged, nut 20 may be attached to shaft 50 as shown and screwed down such that end face 27 encounters block surface 91. This holds shaft 50 more rigid during drilling or center punching.

FIGS. 6 and 7 illustrate a tool according to a first embodiment of the invention. In this embodiment, an expandable sleeve 60A is used in place of sleeve 60 of FIG. 1. FIG. 7 is a sectional view of the sleeve on an expanded scale. Sleeve 60A is also made of any suitable expandable material, such as polyurethane. Sleeve 60A has a plurality of radial slots or grooves 98 on its outer surface, as best illustrated in FIG. 7. Preferably, five or six evenly spaced radial slots are provided. This will allow a greater amount of expansion and compression than the sleeve 60 of FIG. 1 which has a smooth outer face, when the tool is used in the manner illustrated in FIG. 3. The arrangement of FIGS. 6 and 7 is otherwise identical to that of FIG. 1, and like reference numerals have been used for like parts as appropriate.

FIG. 6 is a side view of the tool 10 centered in the entrance 93 of a bore 92 containing broken stud 80E. Stud 80E is broken so near to the surface 91 that insufficient threads are exposed in the upper end of bore 92 to hold shaft 50 tight enough for use of the tool in the manner illustrated in FIG. 5. In this case, the tool is oriented in the same way as in FIG. 5, but the nut 20 is screwed down until end face 27 encounters surface 91. This helps to hold the shaft 50 rigid during drilling or center punching.

When a stud is broken very close to the surface, or even flush with the surface, there is a risk that the tool will not center correctly, since the arrangement as in FIG. 6 relies on a flat face gripping against an opposing flat face. In a second embodiment of the invention, illustrated in FIGS. 8 and 9, the shaft 50 of FIGS. 1 to 5 is replaced by shaft 150, in which slot 54 is eliminated, and a hex bore 110 is provided for receiving a suitable tightening tool such as an Allen wrench. Shaft 150 has a first end 151, and a second end 155, and external screw threads. flat end face 43 at the first end of the shaft with an external chamfer is replaced with an internal chamfer or tapered inner edge 112. The shaft is otherwise identical to that of the first embodiment, and is used with the same nut, and like reference numerals have been used for like parts as appropriate.

The tapered or chamfered inner edge 112 around the periphery of the first end of the shaft will form a pointed edge 114 which can be used for centering purposes when a stud is broken off at or close to the surface 91, as in FIG. 9. In this case, there will be an annular recess between the outer edge of the broken stud and the bore in which it is located, due to the screw threads. The tool is therefore oriented as in FIG. 9 and the pointed peripheral edge 114 of the shaft is located in the annular recess around the broken off end of the stud, as indicated. Nut 20 is screwed down until it encounters surface 91. The peripheral edge 114 of the shaft engaging around the broken stud end will help to hold the shaft centered on the stud while the stud is drilled or center punched as in the previous examples.

The modified shaft is particularly useful since studs are most commonly broken off at or close to the surface. In situations such as that illustrated in FIG. 5, where the broken end is below the surface and part of the threaded bore is exposed, the shaft will be inverted and a suitable tool can then be inserted in hexagonal bore 110 in order to screw the opposite end of the shaft down into the bore, in a similar manner to that described above in connection with FIG. 5. This is safer than the slot 54 of the first embodiment for receiving a screw driver, since slipping of the tightening tool can be avoided.

Having described the invention, it can be seen that it provides a very convenient device for preparing broken stud bolts or the like for extraction by screw extractors by acting as a guide for centering a center punch and/or a drill on the broken face of the stud.

Although some embodiments of the invention have been illustrated and described, various changes may be made in the form, composition, constructions, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A tool, comprising:
   a nut including:
      a central bore including:
         internal threads; and
   a shaft assembly having a first end and a second end, said shaft assembly including:
      a cylindrical shaft having a first end defining said shaft assembly first end and a second end, said shaft including:
         an axial bore therethrough;
         a first portion extending from said shaft first end toward said shaft second end including:
            external threads threadably engaged with said internal threads of said nut;
         a second portion extending from said shaft second end toward said shaft first end;
      an expandable sleeve attached to said shaft second portion such that threading movement of said nut toward said shaft second end may axially compress said sleeve and such that axial compression of said sleeve expands said sleeve radially outward;
   the first end of said shaft having an internal chamfer forming a pointed peripheral edge for locating said first end around a broken stud end.

2. The tool of claim 1, wherein said second end of said shaft assembly has a conical end face.

3. The tool of claim 1, wherein said second end of said shaft has a conical end face.

4. A centering tool for centering a punch or drill on a broken face of a stud, comprising:
   a nut having a central through bore, at least a portion of said bore having internal threads;
   an elongate shaft extending through said bore, the shaft having external threads along at least part of its length threadably engaging the threads in the nut through bore, the shaft having opposite first and second ends and an axial through bore;
   an expandable sleeve secured to the second end of said shaft, whereby threading movement of said nut towards said second end axially compresses said sleeve and expands said sleeve radially outward;
   the sleeve having an outer surface and an inner surface, and a series of spaced, radially extending slots on said outer surface.

5. A centering tool for centering a punch or drill on a broken face of a stud, comprising:
   a nut having a central through bore, at least a portion of said bore having internal threads;
   an elongate shaft extending through said bore, the shaft having external threads along at least part of its length threadably engaging the threads in the nut through bore, the shaft having opposite first and second ends and an axial through bore; and
   an expandable sleeve secured to the second end of said shaft, whereby threading movement of said nut towards said second end axially compresses said sleeve and expands said sleeve radially outward;
   the first end of said shaft having an inwardly facing, peripheral chamfer forming a pointed circular edge at said first end for engagement around a broken stud end.

6. A tool, comprising:
   a nut including:
      a central bore including;
         internal threads; and
   a shaft assembly having a first end and a second end, said shaft assembly including:
      a cylindrical shaft having a first end defining said shaft assembly first end and a second end, said shaft including:
         an axial bore therethrough;
         a first portion extending from said shaft first end toward said shaft second end including:
            external threads threadably engaged with said internal threads of said nut;
         a second portion extending from said shaft second end toward said shaft first end;
      an expandable sleeve attached to said shaft second portion such that threading movement of said nut toward said shaft second end may axially compress said sleeve and such that axial compression of said sleeve expands said sleeve radially outward;
   engagement means on said shaft first end for applying torque to said shaft;
   said engagement means comprising a hexagonal bore.

7. The tool of claim 6, including engaging means on said nut for applying torque to said nut.

8. A tool, comprising:
   a nut having a first end and a second end, said nut including:
      a central bore therethrough including:
         a first portion extending from said nut first end toward said nut second end including internal threads; and
         a second portion extending from said nut second end to said internal threads, said second portion bored to freely slide over external threads that would threadably engage said internal threads; and
   a shaft assembly having a first end and a second end, said shaft assembly including:
      a cylindrical shaft having a first end defining said shaft assembly first end and a second end, said shaft including:
         an axial bore therethrough;
         a first portion extending from said shaft first end toward said shaft second end including:
            external threads threadably engaged with said internal threads of said nut;
         a second portion extending from said shaft second end toward said shaft first end;
      an expandable sleeve attached to said shaft second portion such that threading movement of said nut toward said shaft second end may axially compress said sleeve and such that axial compression of said sleeve expands said sleeve radially outward;
   the first end of said shaft having an internal peripheral chamfer forming a pointed peripheral edge at the end of said shaft.

9. The tool of claim 8, wherein said second end of said shaft assembly has a conical end face.

10. The tool of claim 8, wherein said second end of said shaft has a conical end face.

11. A tool, comprising:
    a nut having a first end and a second end, said nut including:

a central bore therethrough including:
   a first portion extending from said nut first end toward said nut second end including internal threads; and
   a second portion extending from said nut second end to said internal threads, said second portion bored to freely slide over external threads that would threadably engage said internal threads; and a shaft assembly having a first end and a second end, said shaft assembly including:
   a cylindrical shaft having a first end defining said shaft assembly first end and a second end, said shaft including:
     an axial bore therethrough;
     a first portion extending from said shaft first end toward said shaft second end including:
       external threads threadably engaged with said internal threads of said nut;
     a second portion extending from said shaft second end toward said shaft first end;
   an expandable sleeve attached to said shaft second portion such that threading movement of said nut toward said shaft second end may axially compress said sleeve and such that axial compression of said sleeve expands said sleeve radially outward;

said shaft first end having a bore portion including a series of flat faces for engagement with a wrench for applying torque to said shaft.

12. The tool of claim 11, including engaging means on said nut for applying torque to said nut.

* * * * *